US012576494B2

(12) United States Patent
Wierzchon et al.

(10) Patent No.: US 12,576,494 B2
(45) Date of Patent: Mar. 17, 2026

(54) PROTECTIVE SUPPORT STRUCTURE FOR NAILER

(71) Applicants: Robert Bosch GmbH, Stuttgart (DE); Basso Industry Corp., Taichung (TW)

(72) Inventors: Peter Wierzchon, Morton Grove, IL (US); Chien-Kuo Po, Taichung (TW)

(73) Assignees: Robert Bosch GmbH, Stuttgart (DE); Robert Bosch Power Tools GmbH, Leinfelden-Echterdingen (DE); Basso Industry Corp., Taichung City (TW)

( * ) Notice: Subject to any disclaimer, the term of this patent is extended or adjusted under 35 U.S.C. 154(b) by 542 days.

(21) Appl. No.: 17/528,776

(22) Filed: Nov. 17, 2021

(65) Prior Publication Data

US 2023/0081815 A1 Mar. 16, 2023

Related U.S. Application Data

(63) Continuation-in-part of application No. 17/475,560, filed on Sep. 15, 2021, now Pat. No. 12,263,568, and a continuation-in-part of application No. 17/475,511, filed on Sep. 15, 2021, now Pat. No. 11,679,479.

(51) Int. Cl.
*B25C 7/00* (2006.01)
*B25C 1/00* (2006.01)

(52) U.S. Cl.
CPC ................ *B25C 7/00* (2013.01); *B25C 1/005* (2013.01)

(58) Field of Classification Search
CPC ............ B25C 7/00; B25C 1/005; B25C 1/008
See application file for complete search history.

(56) References Cited

U.S. PATENT DOCUMENTS 5,649,661 A * 7/1997 Masuno .................... B25C 7/00 227/8
7,870,987 B1 1/2011 Zhang et al.
2006/0091178 A1 5/2006 Lin
2009/0072001 A1 3/2009 Wu et al.
2009/0084824 A1* 4/2009 Jiang ......................... B25C 7/00 227/110
2014/0158739 A1 6/2014 Grazioli et al.
2017/0368672 A1* 12/2017 Meyer ....................... B25C 1/06

FOREIGN PATENT DOCUMENTS

EP 3 272 464 B1 4/2019

* cited by examiner

*Primary Examiner* — Veronica Martin
(74) *Attorney, Agent, or Firm* — Maginot, Moore & Beck LLP

(57) ABSTRACT

A nailer assembly includes a housing defining a drive section at a forward portion of the nailer assembly, and a grip section at an upper portion of the nailer assembly. A fastener magazine is located beneath the grip section and includes a feed portion proximate the drive section and a distal portion located distally from the drive section. A sacrificial protective support structure is positioned beneath the distal portion of the fastener magazine.

15 Claims, 4 Drawing Sheets

PROTECTIVE SUPPORT STRUCTURE FOR NAILER

This is a continuation-in-part of U.S. application Ser. No. 17/475,511 filed Sep. 15, 2021 and U.S. application Ser. No. 17/475,560 filed Sep. 15, 2021, the disclosures of which are incorporated herein by reference in their entirety.

FIELD

The present disclosure relates generally to a power tool, and more particularly to a nailer assembly.

BACKGROUND

Fasteners such as nails and staples are commonly used in projects ranging from crafts to building construction. While manually driving such fasteners into a work piece is effective, a user may quickly become fatigued when involved in projects requiring a large number of fasteners and/or large fasteners to be driven into a work piece. Moreover, proper driving of larger fasteners into a work piece frequently requires more than a single impact from a manual tool.

In response to the shortcomings of manual driving tools, power-assisted devices for driving fasteners into work pieces, such as nail guns (nailer assemblies), have been developed. Contractors and homeowners commonly use such devices for driving fasteners ranging from brad nails used in small projects to common nails which are used in framing and other construction projects. Compressed air has been traditionally used to provide power for the power-assisted (pneumatic) devices. However, other power sources have also been used, such as DC motors.

Nailer assemblies employ a structural housing that fulfills a variety of functions including the provision of impact protection to internal mechanical and electrical components. A nailer assembly also includes a linear or circular nail magazine (such as roofing nailer) that delivers fasteners to a drive mechanism which drives the fastener into a work piece. The fastener magazine also protects the consumable fasteners before firing, by providing a uniform guide track that allows the fasteners to enter the drive mechanism with a proper and consistent alignment. The functional nature of feeding, for example a linear nail strip or a circular nail coil, creates a protruding magazine structure that can be easily damaged.

An important consideration with nailer assemblies is the weight of the assembly. Simply holding a sufficient number of fasteners to preclude excessive time refilling the nailer assembly can result in a substantial weight of fasteners when the fasteners are relatively large and heavy. Accordingly, significant effort is directed to reducing the weight of the nailer assembly itself. Such efforts are directed to incorporation of lightweight materials and the elimination of unnecessary components.

Typical nailer assemblies thus employ a molded housing and a fastener magazine for feeding consumable fasteners to a drive mechanism. A structural shell around the working mechanism protects the drive mechanism, but the fastener magazine is vulnerable to damage due to functional requirements for operation, such as the protruding structure. The vulnerability is increased if the fastener magazine is constructed of plastic rather than as a metal extrusion in order to reduce weight of the nailer assembly. The vulnerability of the fastener magazine is highlighted in drop tests wherein the protruding structure of the fastener magazine is often the first point of impact.

What is needed therefore is a structure for a nailer assembly that protects the fastener magazine from damage when the nailer assembly is dropped. It would be beneficial if the system did not significantly increase the weight of the nailer assembly or significantly alter the manner in which the nailer assembly is operated.

SUMMARY

In accordance with the disclosure, a sacrificial protective support structure is provided by a support foot which provides a perpendicular alignment of the nosepiece to a work surface. Maintaining perpendicularity minimizes nail ricochets and provides the safest and most productive user experience, particularly with concrete nailer assemblies.

The support foot in one embodiment is a sacrificial structure incorporating a rib structure that creates deliberate deformation and high stress geometry that have a predictable impact performance. Through deformation of the rib structure, peak impact energy applied to the fastener magazine is reduced and, if the impact event is sufficiently severe, the support foot is a sacrificial element, protecting the more expensive and difficult to replace fastener magazine.

In one or more embodiments, the support foot is coupled to the housing of the nailer assembly and is pivotable to a location beneath and immediately adjacent to a distal portion of the fastener magazine. In some embodiments the support foot is coupled to the fastener magazine. The coupling in some embodiments is a substantial t-slot or dovetail geometry that creates substantial guide surfaces capable of distributing impact loads and minimizing material stress in the fastener magazine structure so that the rib structure deforms prior to any damage to the fastener magazine or the coupler.

In some embodiments, the ribs are provided with no in-fill material and designed to provide controlled deformation and predictable failure in overstress scenarios.

Advantageously, the support foot in some embodiments is easily removable by a user and designed as a sacrificial element. In some embodiments, the support foot is configured for tool-less installation and removal.

In some embodiments wherein the foot is non-symmetrical, a feature to allow only one orientation for installation is provided on the support foot and/or on the fastener magazine.

According to one embodiment of the present disclosure, a nailer assembly includes a housing defining a drive section at a forward portion of the nailer assembly, and a grip section at an upper portion of the nailer assembly. A fastener magazine is located beneath the grip section and includes a feed portion proximate the drive section and a distal portion located distally from the drive section. A sacrificial protective support structure is positioned beneath the distal portion of the fastener magazine.

In one or more embodiments, the sacrificial protective support structure includes a first coupling portion and the fastener magazine includes a second coupling portion on a lower housing portion of the fastener magazine, the second coupling portion configured to couple with the first coupling portion.

In one or more embodiments, the sacrificial protective support structure is configured to be removed and/or replaced by a user.

In one or more embodiments, the sacrificial protective support structure is configured for tool-less removal and/or replacement by a user.

In one or more embodiments, the sacrificial protective support structure includes a first coupling portion and an energy absorbing portion. The energy absorbing portion is configured to absorb impact forces by deforming prior to deformation of the first coupling portion.

In one or more embodiments, the energy absorbing portion includes a plurality of ribs extending downwardly from the first coupling portion. In some embodiments, a force absorbing material is located between at least some of the ribs and/or the ribs are coated with the force absorbing material. Force absorbing materials include urethane material rubber materials, and microcellular polyurethane elastomer (MPE).

In one or more embodiments the first coupling portion includes an open end portion configured to receive at least a portion of the second coupling portion therethrough, a closed end portion opposite the open end portion, and a slide arm extending from the open end portion to the closed end portion.

In one or more embodiments the slide arm includes a retaining groove and the second coupling portion includes a spring loaded button configured to engage the retaining groove. The second coupling portion further includes a support arm configured to directly contact the slide arm.

According to one embodiment of the present disclosure, a method is provided for replacing a first sacrificial protective support structure of a nailer assembly including a housing. The housing defines a drive section at a forward portion of the nailer assembly and a grip section at an upper portion of the nailer assembly. The nailer assembly further includes a fastener magazine beneath the grip section which includes a feed portion proximate the drive section and a distal portion located distally from the drive section. The method includes decoupling the first sacrificial protective support structure from the fastener magazine, and coupling a second sacrificial protective support structure to the fastener magazine at a location beneath the distal portion of the fastener magazine.

In one or more embodiments, decoupling the first sacrificial protective support structure from the fastener magazine includes moving the first sacrificial protective support structure in a rearward direction by sliding a slide surface of a first coupling portion of the first sacrificial protective support structure along a support arm of a second coupling portion of the fastener magazine.

In one or more embodiments, decoupling the first sacrificial protective support structure from the fastener magazine further includes forcing a spring biased button toward a lower housing portion of the fastener magazine with a wall of a retaining groove of a slide arm of the first coupling portion.

In one or more embodiments, coupling the second sacrificial protective support structure includes moving the second sacrificial protective support structure in a forwardly direction with an open end portion of a third coupling portion of the second sacrificial protective support structure aligned with the support arm of the second coupling. The movement results in inserting the support arm of the second coupling into the open end portion of the third coupling portion, and sliding a slide surface of a sliding arm of the third coupling portion along the support arm of the second coupling portion of the fastener magazine.

In one or more embodiments, coupling the second sacrificial protective support structure further includes forcing a spring biased button toward a lower housing portion of the fastener magazine with a wall of a retaining groove of the sliding arm of the third coupling portion.

In one or more embodiments, coupling the second sacrificial protective support structure further includes abutting the support arm of the second coupling portion of the fastener magazine against a closed end portion of the third coupling portion. At about the same time of the abutment, the spring biased button is inserted into the retaining groove of the sliding arm of the third coupling portion.

In one or more embodiments, decoupling the first sacrificial protective support structure from the fastener magazine is accomplished by a user without the use of a tool.

BRIEF DESCRIPTION OF THE DRAWINGS

The above described features and advantages, as well as others, will become more readily apparent to those of ordinary skill in the art by reference to the following detailed description and accompanying drawings.

DETAILED DESCRIPTION

Figure 1:
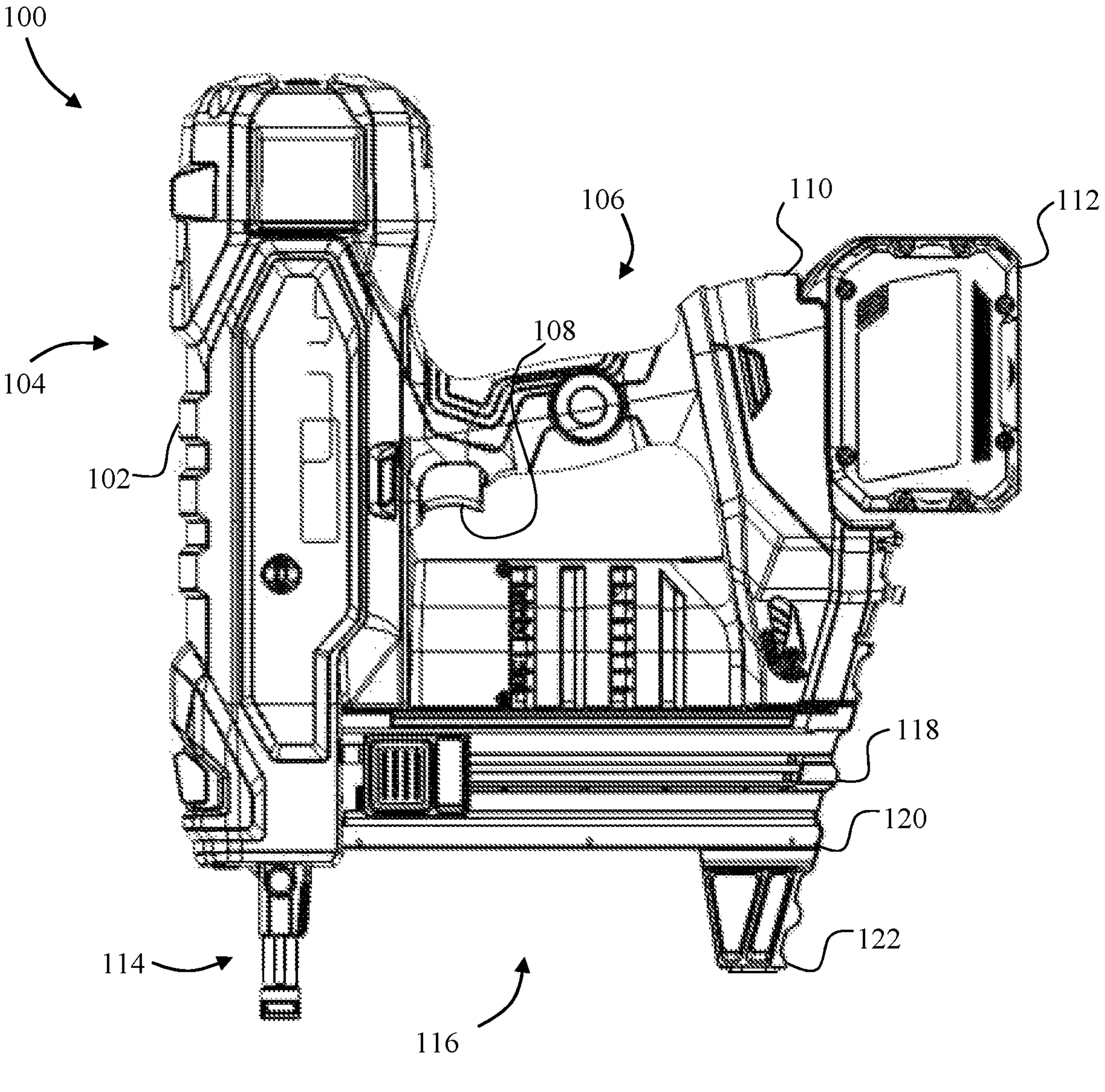
FIG. 1 depicts a side plan view of a power tool of the present disclosure in the form of a nailer assembly including a sacrificial protective support structure.

For the purpose of promoting an understanding of the principles of the disclosure, reference will now be made to the embodiments illustrated in the drawings and described in the following written description. It is to be understood that no limitation to the scope of the disclosure is thereby intended. It is further to be understood that the present disclosure includes any alterations and modifications to the illustrated embodiments and includes further applications of the principles of the disclosure as would normally occur to one skilled in the art to which this disclosure pertains.

Referring to FIG. 1, there is depicted a power tool 100 in the form of a nailer assembly. The nailer assembly 100 includes a housing 102 that defines a drive section 104 and a grip section 106. A trigger 108 is provided in the grip section 106 and a battery receptacle 110 is configured to removably couple with a battery 112 at the grip section 106. In other embodiments, the power tool is a corded or air operated tool. The nailer assembly 100 further includes a work contact element (WCE) assembly 114 which extends out of the housing 102. A removable fastener magazine 116 also extends distally from the drive section 104. The fastener magazine 116 includes a fastener supply portion 118 that includes a lower housing portion 120. The housing portion 120 in some embodiments is metal, glass filled nylon, or another desired material. The above identified components of the nailer assembly 100 operate in any known or desired manner and such operations are not further described herein.

Continuing with FIG. 1, a sacrificial protective support structure 122 is provided beneath the fastener magazine 116 at a location distal to the drive section 104. The sacrificial protective support structure 122 in some embodiments is made from the same material as the housing portion 120 of the fastener magazine 116 and/or the housing 102. In some embodiments the sacrificial protective support structure 122 is supported by the housing 102 and simply positioned adjacent to or in contact with the lower housing portion 120 at a location distal from the drive section 104. For example, a pivoting connection may be provided.

Figure 2:
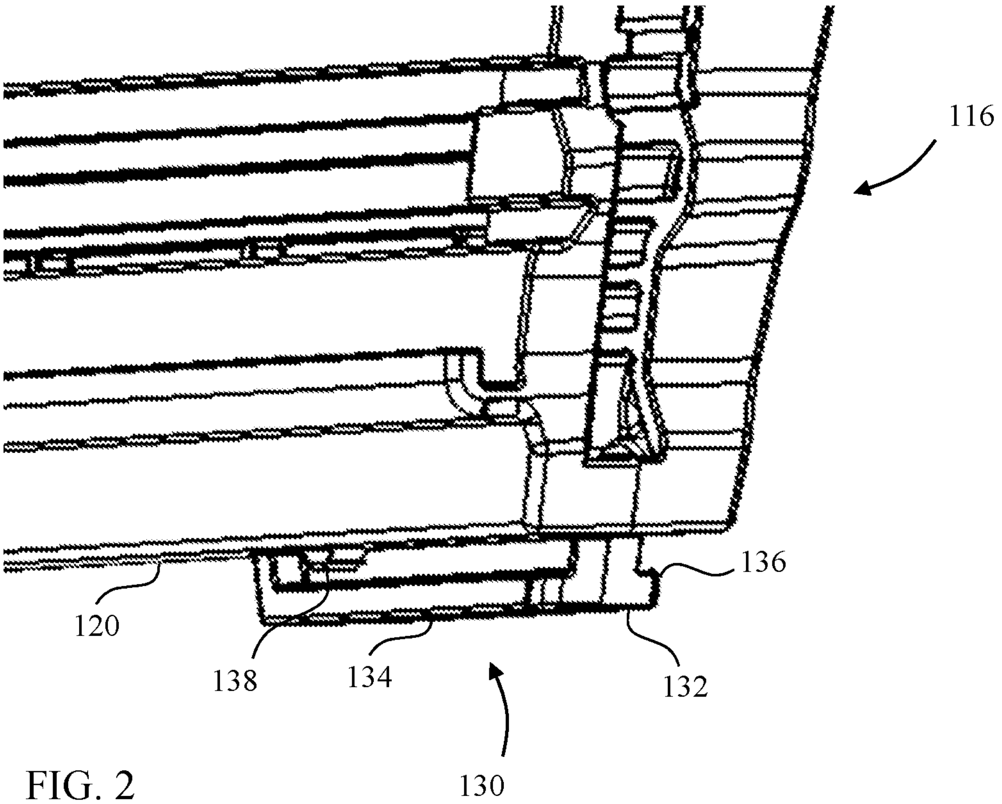
FIG. 2 depicts a partial side perspective view of the fastener magazine of FIG. 1 with the sacrificial protective support structure removed to show a coupling portion of the fastener magazine.

In the embodiment of FIG. 1, however, the sacrificial protective support structure 122 is connected to, and supported by, the fastener magazine 116 through a coupling portion 130 shown in FIG. 2. The coupling portion 130 extends downwardly from the lower housing portion 120 and includes a cross bar 132 that includes two support arms 134 and 136. In some embodiments, a dovetail configuration is used in place of the T-shaped geometry of FIG. 2. The coupling portion 130 includes a spring loaded retaining button 138 which includes a spring member (not shown) which biases the button downwardly away from the lower housing portion 120.

Figure 3:
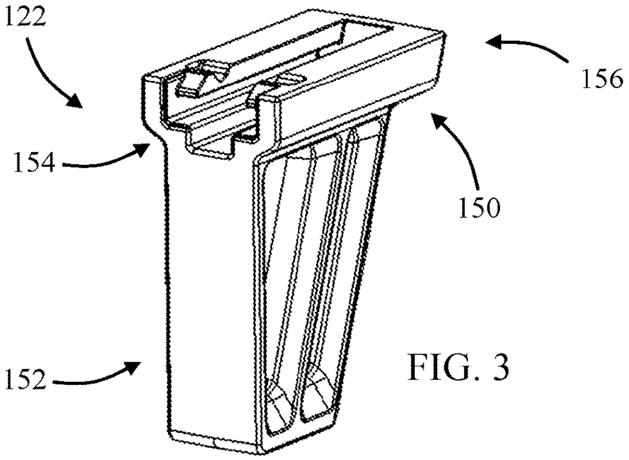
FIG. 3 depicts a side perspective view of the sacrificial protective support structure of FIG. 1.
Figure 4:
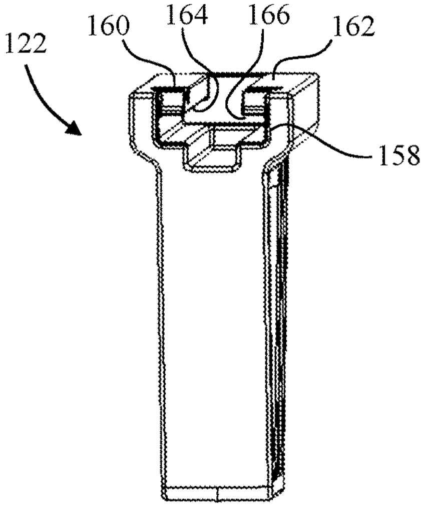
FIG. 4 depicts a front perspective view of the sacrificial protective support structure of FIG. 1.
Figure 5:
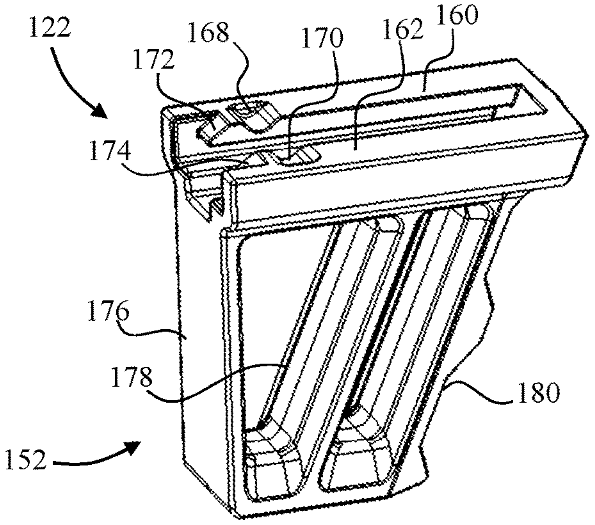
FIG. 5 depicts a top perspective view of the sacrificial protective support structure of FIG. 1.

The sacrificial protective support structure 122, shown in further detail in FIGS. 3-5, includes a coupling portion 150 which is complimentary to the coupling portion 130, and an energy absorbing portion 152. The coupling portion 150 includes an open end 154 and a closed end 156. A coupling slot 158 extends from the open end 154 to the closed end 156. The coupling slot 158 is sized and shaped to receive the cross bar 132, including the support arms 134 and 136, therein. An upper boundary of the coupling slot 158 is defined by slide arms 160 and 162. The slide arms 160/162 include respective lower slide surfaces 164/166 and retaining grooves 168/170 which are defined by wall portions extending downwardly from the upper surfaces of the slide arms 160/162. Leading edges of the slide arms 160/162 are defined by ramps 172 and 174.

The energy absorbing portion 152 includes three ribs 176, 178, and 180. The ribs are spaced apart with no material therebetween. In some embodiments, a force absorbing material is provided between the ribs. Force absorbing materials include urethane material rubber materials, and microcellular polyurethane elastomer (MPE). The ribs 176, 178, and 180 in some embodiments are formed of the same material as the lower housing portion 120 and/or the housing 102. The materials, as well as the shape, size, and orientation, of the ribs and any adjacent structure are selected to provide controlled deformation of, and predictable failure of, the ribs 176, 178 and 180 when subjected to, e.g., an impact.

Figure 6:
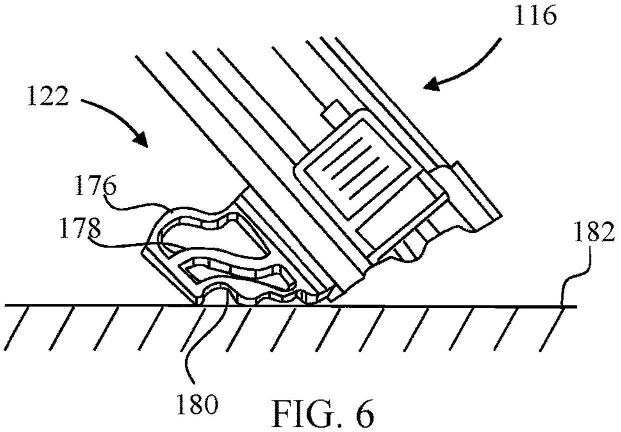
FIG. 6 depicts a partial side plan view of the nailer assembly of FIG. 1 as the sacrificial protective support structure is destructively deformed by an impact.

In particular, the ribs 176, 178 and 180 are designed to fail prior to damage to the fastener magazine 116 including the coupling portion 130. Thus is shown in FIG. 6 wherein the sacrificial protective support structure 122 is shown in a deformed state as the nailer assembly contacts a surface 182 after a fall. Because of the energy absorbed by the deformation of the energy absorbing portion 152, energy which is transferred to the fastener magazine 116 is not sufficient to damage the fastener magazine 130.

Figure 7:
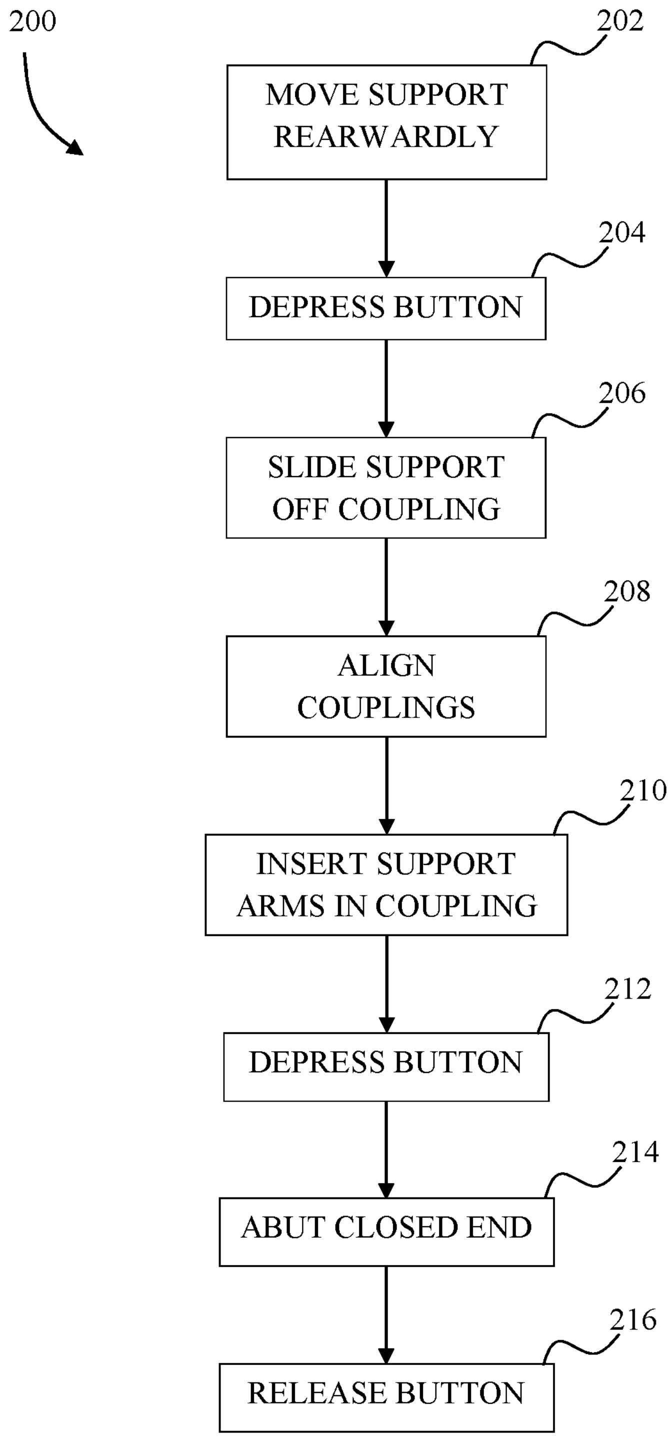
FIG. 7 depicts a method of replacing the sacrificial protective support structure of FIG. 1.

The sacrificial protective support structure 122 in this embodiment is configured to deform non-elastically for significant falls while protecting the fastener magazine 116 from damage. Accordingly, after some impacts it is necessary to replace the sacrificial protective support structure 122. While in some embodiments fasteners such as screws are used to secure the sacrificial protective support structure 122 to, e.g., the fastener magazine 116, in the embodiment of FIG. 1 the sacrificial protective support structure 122 is configured to be removed by a user without the need for tools. Replacement of the sacrificial protective support structure 122 in this embodiment is accomplished in accordance with method 200 shown in FIG. 7.

Initially, the nailing assembly 100 is in the configuration of FIG. 1, with the spring loaded buttons 138 inserted into the retaining grooves 168/170. At block 202 a user supports the nailing assembly 100 while pulling the sacrificial protective support structure 122 rearwardly (to the right as depicted in FIG. 1). As the sacrificial protective support structure 122 is pulled rearwardly, the walls of the slide arms 160/162 which define the retaining grooves 168/170 are forced against the spring loaded retaining buttons 138 (only one is shown in FIG. 2) forcing the spring loaded retaining buttons 138 upwardly toward the lower housing portion 120, allowing the slide arms 160/162 to pass beneath the spring loaded retaining buttons 138. At block 206 rearward movement of the sacrificial protective support structure 122 continues with the slide surfaces 164/166 of the slide arms 160/162 sliding along the support arms 134/136 until the couplings 130 and 150 are decoupled.

The user then obtains a replacement sacrificial protective support structure 122 identical to the removed sacrificial protective support structure 122. The coupling portion 150 of the replacement sacrificial protective support structure 122 is then aligned with the coupling portion 130 (block 208) and the cross bar 132, including the support arms 134 and 136, is inserted into the open end 154 of the coupling portion 150 (block 210) by moving the replacement sacrificial protective support structure 122 forwardly (to the left as depicted in FIG. 1). Insertion continues with the slide surfaces 164/166 of the coupling portion 150 sliding across the support arms 134/136 until the ramps 172/174 contact the spring loaded buttons 138.

Continued movement of the replacement sacrificial protective support structure 122 causes the ramps 172/174 to force the spring loaded retaining buttons 138 upwardly toward the lower housing portion 120 thereby depressing the spring loaded retaining buttons 138 (block 212). Once the ramps 172/174 move past the depressed spring loaded retaining buttons 138, the support arms 134/136 come into abutment with the closed end 156 (block 214). At about the same time, the retaining grooves 168/170 move into position beneath the depressed spring loaded retaining buttons 138, releasing the spring loaded retaining buttons 138 (block 216) and allowing the springs of the spring loaded retaining buttons 138 to force the spring loaded retaining buttons 138 into the retaining grooves 168/170 thereby locking the replacement sacrificial protective support structure 122 into the desired position.

It is to be appreciated that in different embodiments some of the above identified actions are not performed in the manner described above. Moreover, for different embodiments different structural arrangements result in modification of the method. By way of example, in some embodiments the sacrificial protective support structure is configured to be loaded by moving the sacrificial protective structure rearwardly. In other embodiments the sacrificial protective support structure is configured to be loaded from the bottom of the coupling portion of the fastener magazine. Thus, movement of the replacement sacrificial protective support structure is in an upward direction. In some embodiments a spring loaded button is not used and in other embodiments both ends of the coupling portion of the sacrificial protective support structure are open. In some of these embodiments, a screw or other type of fastener easily operated by a user is used to secure the sacrificial protective support structure at the desired location.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

We claim:

1. A nailer assembly, comprising:

a housing defining a drive section at a forward portion of the nailer assembly, and a grip section at an upper portion of the nailer assembly;

a fastener magazine beneath the grip section and including a feed portion proximate the drive section and a distal portion located distally from the drive section; and a sacrificial protective support structure positioned beneath the distal portion of the fastener magazine.

2. The nailer assembly of claim 1, wherein:

the sacrificial protective support structure includes a first coupling portion; and the fastener magazine includes a second coupling portion on a lower housing portion of the fastener magazine, the second coupling portion configured to couple with the first coupling portion.

3. The nailer assembly of claim 2, wherein the sacrificial protective support structure is configured to be removed by a user.

4. The nailer assembly of claim 3, wherein the sacrificial protective support structure is configured for tool-less removal by a user.

5. The nailer assembly of claim 1, wherein the sacrificial protective support structure includes:

a first coupling portion; and an energy absorbing portion, the energy absorbing portion configured to absorb impact forces by deforming prior to deformation of the first coupling portion.

6. The nailer assembly of claim 5, wherein the energy absorbing portion comprises:

a plurality of ribs extending downwardly from the first coupling portion.

7. The nailer assembly of claim 6, wherein:

the fastener magazine includes a second coupling portion on a lower housing portion of the fastener magazine, the second coupling portion configured to couple with the first coupling portion.

8. The nailer assembly of claim 7, wherein the first coupling portion includes:

an open end portion at a first side of the sacrificial protective support structure and configured to receive at least a portion of the second coupling portion therethrough;

a closed end portion at a second side of the sacrificial protective support structure opposite the open end portion; and a slide arm extending along a top of the sacrificial protective support structure from the open end portion to the closed end portion.

9. The nailer assembly of claim 8, wherein:

the slide arm includes a retaining groove;

the second coupling portion includes a spring loaded button configured to engage the retaining groove; and the second coupling portion includes a support arm configured to directly contact the slide arm.

10. A method of replacing a first sacrificial protective support structure of a nailer assembly including a housing defining a drive section at a forward portion of the nailer assembly and a grip section at an upper portion of the nailer assembly, the nailer assembly further including a fastener magazine, beneath the grip section, which includes a feed portion proximate the drive section and a distal portion located distally from the drive section, comprising;

decoupling the first sacrificial protective support structure from the fastener magazine; and coupling a second sacrificial protective support structure to the fastener magazine at a location beneath the distal portion of the fastener magazine;

wherein decoupling the first sacrificial protective support structure from the fastener magazine comprises: moving the first sacrificial protective support structure in a rearward direction by sliding a slide surface of a first coupling portion of the first sacrificial protective support structure along a support arm of a second coupling portion of the fastener magazine.

11. The method of claim 10, wherein decoupling the first sacrificial protective support structure from the fastener magazine further comprises:

forcing a spring biased button toward a lower housing portion of the fastener magazine with a wall of a retaining groove of a slide arm of the first coupling portion.

12. The method of claim 10, wherein coupling the second sacrificial protective support structure comprises:

moving the second sacrificial protective support structure in a forwardly direction with an open end portion of a third coupling portion of the second sacrificial protective support structure aligned with the support arm of the second coupling;

inserting the support arm of the second coupling portion into the open end portion of the third coupling portion; and sliding a slide surface of a sliding arm of the third coupling portion along the support arm of the second coupling portion of the fastener magazine.

13. The method of claim 12, wherein coupling the second sacrificial protective support structure further comprises:

forcing a spring biased button toward a lower housing portion of the fastener magazine with a wall of a retaining groove of the sliding arm of the third coupling portion.

14. The method of claim 13, wherein coupling the second sacrificial protective support structure further comprises:

abutting the support arm of the second coupling portion of the fastener magazine against a closed end portion of the third coupling portion; and inserting the spring biased button into the retaining groove of the sliding arm of the third coupling portion.

15. The method of claim 10, wherein decoupling the first sacrificial protective support structure from the fastener magazine comprises:

decoupling the first sacrificial protective support structure from the fastener magazine without the use of a tool.

* * * * *